United States Patent [19]

Arzoumanidis et al.

[11] Patent Number: 4,866,022

[45] Date of Patent: Sep. 12, 1989

[54] OLEFIN POLYMERIZATION CATALYST

[75] Inventors: Gregory G. Arzoumanidis; Nicholas M. Karayannis; Habet M. Khelghatian, all of Naperville; Sam S. Lee, Hoffman Estates, all of Ill.; Bryce V. Johnson, Mound, Minn.

[73] Assignee: Amoco Corporation, Chicago, Ill.

[21] Appl. No.: 186,359

[22] Filed: Apr. 25, 1988

Related U.S. Application Data

[63] Continuation of Ser. No. 55,430, May 28, 1987, abandoned, which is a continuation-in-part of Ser. No. 875,180, Jun. 17, 1986, abandoned, which is a continuation-in-part of Ser. No. 741,858, Jun. 6, 1985, Pat. No. 4,612,299, which is a continuation-in-part of Ser. No. 629,106, Jul. 9, 1984, abandoned, which is a continuation-in-part of Ser. No. 592,910, Mar. 23, 1984, Pat. No. 4,540,679.

[51] Int. Cl.$^4$ .............................................. C08F 4/64
[52] U.S. Cl. .................................. 502/120; 502/118; 502/121; 502/122; 502/123; 502/124; 502/125; 502/126; 502/127; 502/133
[58] Field of Search .............. 502/118, 120, 121, 122, 502/123, 124, 125, 126, 127, 133

[56] References Cited

U.S. PATENT DOCUMENTS

| | | | |
|---|---|---|---|
| 3,408,340 | 10/1968 | Tanaka et al. | 260/88.2 |
| 3,701,763 | 10/1972 | Wada et al. | 260/88.2 R |
| 3,850,899 | 11/1974 | Wada et al. | 260/88.2 R |
| 4,107,413 | 8/1978 | Giannini et al. | 526/114 |
| 4,107,414 | 8/1978 | Giannini et al. | 526/114 |
| 4,143,223 | 5/1979 | Toyota et al. | 526/125 |
| 4,180,636 | 12/1979 | Hirota et al. | 526/125 |
| 4,218,339 | 8/1980 | Zucchini et al. | 252/429 B |
| 4,220,745 | 9/1980 | Tanaka et al. | 526/125 |
| 4,226,741 | 10/1980 | Luciani et al. | 252/429 B |
| 4,290,915 | 9/1981 | Toyota et al. | 252/429 B |
| 4,297,463 | 10/1981 | Ueno et al. | 526/128 |
| 4,298,718 | 11/1981 | Mayr et al. | 526/125 |
| 4,330,649 | 5/1982 | Kioka et al. | 526/125 |
| 4,331,561 | 5/1982 | Luciani et al. | 252/429 B |
| 4,336,360 | 6/1982 | Giannini et al. | 526/114 |
| 4,365,048 | 12/1982 | Ueno et al. | 526/128 |
| 4,401,589 | 8/1983 | Kioka et al. | 252/429 B |
| 4,419,269 | 12/1983 | Schell | 502/120 X |
| 4,442,276 | 4/1984 | Kashiwa et al. | 526/125 |
| 4,460,701 | 7/1984 | Terano et al. | 502/126 X |
| 4,472,524 | 9/1984 | Albizatti | 526/125 X |
| 4,473,660 | 9/1984 | Albizatti et al. | 526/125 X |
| 4,476,289 | 10/1984 | Mayr et al. | 526/125 |
| 4,522,930 | 6/1985 | Albizatti et al. | 526/125 X |
| 4,540,679 | 9/1985 | Arzoumanidis et al. | 502/133 X |
| 4,544,717 | 10/1985 | Mayr et al. | 526/125 |
| 4,562,173 | 12/1985 | Terano et al. | 502/133 X |
| 4,612,299 | 9/1986 | Arzoumanidis et al. | 502/126 X |
| 4,619,981 | 10/1986 | Tajima et al. | 526/125 |
| 4,672,050 | 6/1987 | Sasaki et al. | 526/119 X |
| 4,742,139 | 5/1988 | Kioka et al. | 526/125 |
| 4,743,665 | 5/1988 | Sasaki et al. | 526/119 |

FOREIGN PATENT DOCUMENTS

| | | |
|---|---|---|
| 86643 | 8/1983 | European Pat. Off. |
| 86645 | 8/1983 | European Pat. Off. |
| 1539900 | 2/1979 | United Kingdom |
| 1554340 | 10/1979 | United Kingdom |
| 2111066 | 6/1983 | United Kingdom |

OTHER PUBLICATIONS

Chemicky Primysl, 36/61, 72 (1986), No. 2.
Die Angewandte Makromolekulare Chemie, 120, (1984), 73–90 (nr. 1935).
Chemical Abstracts, vol. 61, 13339a–e.
Chemical Abstracts, 1955, 909g.
Chemical Abstracts, 1956, 3217h.
Chemical Abstracts, 1962, 7344h.

*Primary Examiner*—Patrick P. Garvin
*Attorney, Agent, or Firm*—Wallace L. Oliver; William H. Magidson; Ralph C. Medhurst

[57] ABSTRACT

A solid hydrocarbon-insoluble, alpha-olefin polymerization catalyst component with superior activity, stereospecificity and morphology characteristics comprises the product formed by (A) forming a solution of a magnesium-containing species from a magnesium carbonate or a magnesium carboxylate; (B) precipitating solid particles from such magnesium-containing solution by treatment with a transition metal halide and an organosilane; (C) reprecipitating such solid particles from a mixture containing a cyclic ether; and (D) treating the reprecipitated particles with a transition metal compound and an electron donor.

30 Claims, No Drawings

OLEFIN POLYMERIZATION CATALYST

This is a continuation of application Ser. No. 055,430, filed May 28, 1987, and now abandoned which in turn is a continuation-in-part of Ser. No. 875,180 filed June 17, 1986, and now abandoned, which is a continuation-in-part of Ser. No. 741,858, filed June 6, 1985, and now U.S. Pat. No. 4,612,299 which is a continuation-in-part of Ser. No. 629,106, filed 7/9/84, now abandoned and Ser. No. 592,910, filed 3/23/84, now U.S. Pat. No. 4,540,679.

BACKGROUND OF THE INVENTION

This invention relates to catalyst systems useful for polymerizing alpha-olefins and particularly relates to a supported titanium halide catalyst component and a catalyst system containing such component.

Magnesium-containing supported titanium halide-based alpha-olefin polymerization catalyst components are now well known in the art. Typically, these catalysts are recognized for their performance based on activity and stereospecificity. However, commercial olefin polymerization, especially gas-phase alpha-olefin polymerization, requires additional catalyst attributes for economical large-scale operation. Specifically, polymer morphology, typically dependent upon catalyst morphology, many times is critical. Included in good polymer morphology is uniformity of particle size and shape, resistance to attrition and an acceptably high bulk density. Minimization of very small particles (fines) typically is very important, especially in gas-phase polymerization to avoid transfer or recycle line pluggage. Very large particles also must be avoided to minimize formation of lumps and strings in the reactor.

A suitable catalyst should produce a polymer with minimum particles having average diameter less than 150 microns (fines) or greater than 850 microns. Another property which is important commercially is maintenance of an acceptably high bulk density. Typically, this property is measured in pounds per cubic foot of polymer. One approach to improve morphology control as described in U.S. Pat. No. 4,540,679 is to solubilize a magnesium species with carbon dioxide in an alcohol solvent. Although Example VI of this patent describes a high activity catalyst, its morphology needs improvement in that the catalyst produced too many fines.

The present invention incorporates a series of catalyst formation process steps which produce a catalyst with exceptionally high activity and stereospecificity combined with very good morphology.

Supported, magnesium-containing, titanium-containing, electron donor-containing olefin polymerization catalysts now are well known in the art. Use of carbon dioxide in preparing a magnesium-containing support has been described in the aforementioned U.S. Pat. No. 4,540,679. Also, in a different context use of carbon dioxide was described in U.S. Pat. Nos. 4,246,383; 4,244,838; 4,529,715; and 4,530,915. Treating alcoholic solutions and suspensions of alkaline earth alcoholates with carbon dioxide and sulfur dioxide was noted in Chemical Abstracts, Vol. 76, 853050v (1972). Forming a soluble magnesium species has been described in U.S. Pat. Nos. 4,315,874; 4,399,054; 4,071,674; and 4,439,540. Examples of use of silicon compounds in formation of a catalyst component include U.S. Pat. Nos. 4,071,672; 4,085,276; 4,220,554; and 4,315,835. Tetrahydrofuran (THF) has been described variously to complex a magnesium chloride species (e.g., U.S. Pat. Nos. 4,482,687, 4,277,372, 3,642,746, and 3,642,772 and in European Patent No. 131,832); as a modifier in a cocatalyst (e.g., U.S. Pat. Nos. 4,158,642 and 4,148,756); and as a solvent (e.g., U.S. Pat. Nos. 4,477,639 and 4,518,706). However the specific combination of steps taught in this invention to produce a catalyst with extremely advantageous properties have not been disclosed.

SUMMARY OF THE INVENTION

A solid hydrocarbon-insoluble, alpha-olefin polymerization catalyst component with superior activity, stereospecificity and morphology characteristics comprises the product formed by A) forming a solution of a magnesium containing species from a magnesium carbonate or a magnesium carboxylate; B) precipitating solid particles from such magnesium-containing solution by treatment with a transition metal halide and an organosilane; C) reprecipitating such solid particles from a mixture containing a cyclic ether; and D) treating the reprecipitated particles with a transition metal compound and an electron donor.

BRIEF DESCRIPTION OF THE INVENTION

The invention described herein is based on a solubilized magnesium species such as described in U.S. Pat. No. 4,540,679. It has been found that first forming a solid precipitate from such solubilized magnesium species with a titanium halide in the presence of an organosilane of the type $R_nSiR'_{4-n}$, wherein $n = 0$ to 4, R = hydrogen, alkyl, alkoxy, chloroalkyl or aryl and R' = OR or Cl, produces a precipitate with a uniform particle size.

In another aspect of this invention, it has been found that the catalyst component may be improved by reprecipitating the solid precipitate formed as described above from a solution containing a cyclic ether such as tetrahydrofuran (THF). The reprecipitated solid particles have a narrow particle size distribution and form a catalyst with very high activity and stereospecificity together with high bulk density. Typical bulk densities were increased from about 25 lbs/ft$^3$ to about 28–30 lbs/ft$^3$. To form a suitable catalyst component, the reprecipitated solid described above is treated with a Ti(IV) species in the presence of an electron donor. It has been found that the best catalyst is formed by a two-stage treatment in which the reprecipitated solid first is treated with a Ti(IV) species, then the resulting solid is retreated with a mixture of Ti(V) species and an electron donor.

Catalyst components of this invention may be prepared by precipitating a first solid material from a hydrocarbon medium by treating a magnesium carbonate or carboxylate composition with a transition metal compound, preferably in the presence of an organosilane compound. The first precipitated solid is reprecipitated from a medium containing a cyclic ether such as tetrahydrofuran (THF) to form uniform solid particles. The resulting particles are retreated with a suitable Ti(IV) compound and a suitable electron donor to form an olefin polymerization catalyst component. Preferably, the reprecipitated solid particles are first treated with a Ti(IV) compound in a diluent and then retreated with a Ti(IV) compound and an electron donor. Such component may be combined with a suitable aluminum alkyl compound together with suitable modifier compounds to form a catalyst system useful to polymerize olefins, especially propylene. Using the catalyst of this invention, polymer particles with a narrow particle size distribution in high yield and stereospecificity may be obtained.

In one aspect of this invention, a soluble magnesium-containing species is formed.

Soluble magnesium carbonates and carboxylates useful in this invention include those described in U.S. Pat. No. 4,540,679 and U.S. application Ser. No. 741,858, filed June 6, 1985, assigned to a common assignee, both incorporated herein by reference. Typically, magnesium carbonate and carboxylate solutions are formed in a suitable diluent by treating a magnesium compound with carbon dioxide, preferably in the presence of a suitable solvating agent such as an alcohol. For example, magnesium hydrocarbyl carbonate solutions can be formed by suspending magnesium alkoxide, such as magnesium ethoxide, in an alcohol medium and adding carbon dioxide until the magnesium ethoxide dissolves to form magnesium ethyl carbonate. Also, magnesium alkoxide solution with an alcohol can be used.

Specific examples of magnesium alcoholates which are useful according to this invention include $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, $Mg(OC_2H_4Cl)_2$ and $Mg(OC6hd 16H_{33})(OC_{18}H_{37})$. Mixtures of magnesium alcoholates also can be employed if desired. In addition, mixtures of magnesium alcoholates with other alkali earth metal alkoxides, alkali metal alkoxides, minor amounts of other suitable metal salts such as alcoholates of lanthanum and the lanthanide metals, magnesium halides, hydroxyhalides, carboxylates, and so forth, can be used. Magnesium hydrocarbyl alcoholates are functional equivalents of the magnesium alcoholates when alcohol is used as the suspending medium for the reaction with carbon dioxide since the magnesium hydrocarbyl alcoholates are converted to $Mg(OR)(OR')$ in alcohol. Corresponding Mn(II) and Fe(II) compounds, such as $Mn(OCH_3)_2$ and $Fe(OCH_3)_2$, are considered equivalent to Mg(II) compounds.

In inert suspending medium the magnesium hydrocarbyl alcoholates are converted into magnesium hydrocarbyl carbonate salts on the addition of carbon dioxide. Spherical forms of magnesium alkoxides can be used, if desired, particularly when an alcoholic medium is not employed for the carbonation step. Reaction of a magnesium alcoholates compound with carbon dioxide can be represented as follows:

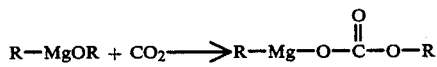

where R is a hydrocarbyl group of 1 to 20 carbon atoms.

Alternatively, a solution of a hydrocarbyl magnesium compound with carbon dioxide may be used in this invention. Reaction of hydrocarbyl magnesium compound with carbon dioxide to form a magnesium carboxylate can be represented as follows:

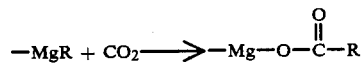

where R is a hydrocarbyl group of 1 to 20 carbon atoms. It has been found that sulfur dioxide can be substituted for carbon dioxide in forming such magnesium carboxylate or carbonate compounds.

Hydrocarbyl magnesium compounds useful in this invention have the structure R—Mg—Q wherein Q is hydrogen, halogen or R' (each R' is independently a hydrocarbyl group of 1 to 20 carbon atoms.) Specific examples of hydrocarbyl magnesium compounds useful in this invention include:

$Mg(CH_3)_2$, $Mg(C_2H_5)_2$, $Mg(C_4H_9)_2$, $Mg(C_6H_5)_2$, $Mg(C_6H_{13})_2$, $Mg(C_9H_{19})_2$, $Mg(C_{10}H_7)_2$, $Mg(C_{12}H_9)_2$, $Mg(C_{12}H_{25})_2$, $Mg(C_{16}H_{33})_2$, $Mg(C_{20}H_{41})_2$, $Mg(CH_3)(C_2H_5)$, $Mg(CH_3)(C_6H_{13})$, $Mg(C_2H_5)(C_8H_{17})$, $Mg(C_6H_{13})(_{20}H_{41})$, $Mg(C_3H_7)(C_{10}H_7)$, $Mg(C_2H_4Cl)_2$ and $Mg(C_{16}H_{33})(C_{18}H_{37})$, $Mg(C_2H_5)(H)$, $Mg(C_2H_5)(Cl)$, $Mg(C_2H_5)(Br)$, and the like. Mixtures of hydrocarbyl magnesium compounds also can be employed if desired.

Dihydrocarbyl magnesium compounds preferred for use in this invention are those of the formula $Mg(R')_2$ wherein R' is as defined above. In terms of catalytic activity and stereospecificity, best results are achieved through the use of hydrocarbyl magnesium halide compounds of the formula $Mg(R')Q'$ wherein R' is an alkyl radical of 1 to about 18 carbon atoms, an aryl radical of 6 to about 12 carbon atoms or an alkaryl or aralkyl radical of 7 to about 12 carbon atoms and Q' is chloride or bromide.

Alcohols useful in solvating magnesium carbonate and carboxylates include those having the structure HOR' wherein R' is an alkyl radical of 1 to about 18 carbon atoms, an aryl radical of 6 to about 12 carbon atoms or an alkaryl or aralkyl radical of 7 to about 12 carbon atoms. Typically, one or more alcohols containing from 1 to 12 carbon atoms can be used such as methanol, ethanol, propanol, isopropanol, tert-butyl alcohol, cyclohexanol, 2-ethylhexanol, dodecanol, and the like. Of these, 2-ethyl-1-hexanol is preferred.

In another aspect of this invention, a magnesium carbonate or carboxylate solution is treated with a transition metal halide, preferably a titanium(IV) halide to precipitate a first solid component. Titanium tetrachloride is most preferred. Preferably, such treatment is performed in a suitable diluent and preferably in the presence of an organosilane.

It has been found that incorporation of suitable organosilanes is useful in preparing solid catalyst components with acceptable morphology, i.e., with particle distributions not containing excessive amounts of fines or large particles. Suitable organosilanes useful as reagents in precipitating a solid from a soluble magnesium species according to this invention have a formula: $R_nSiR'_{4-n}$, wherein n=0 to 4 and wherein R is hydrogen or an alkyl, alkoxy, haloalkyl or aryl radical containing one to about ten carbon atoms or a halosilyl radical or haloalkylsilyl radical containing one to about eight carbon atoms, and R' is OR or a halogen. Typically, R is an alkyl or chloroalkyl radical containing one to about eight carbon atoms and one to about four chlorine atoms, and R' is chlorine or an —OR radical containing one to four carbon atoms. A suitable organosilane may contain different R' groups. Mixtures of organosilanes may be used. Preferable organosilanes include trimethylchlorosilane, trimethylethoxysilane, dimethyldichlorosilane and tetraethoxysilane.

In preparation of the stereospecific supported catalyst components of this invention, typically, the soluble magnesium-containing species, titanium(IV) halide component and organosilane component are contacted in amounts such that the atomic ratio of magnesium to titanium is at least about 0.3:1 and preferably, is from about 0.4:1 to about 20:1 and more preferably, from about 0.5:1 to about 3:1. The Si/Ti atomic ratio typically can range from about 0.1:1 to about 2.0:1 and preferably is about 0.3:1 to about 1:1.

In another aspect of this invention, the first precipitated solid is reprecipitated from a solution containing a cyclic ether. In a typical reprecipitation procedure, the first solid is entirely solubilized in the cyclic ether solvent and then solid is allowed to reprecipitate to form particles of uniform size. The preferable ether is tetrahydrofuran, although other suitable cyclic ethers, such as tetrahydropyran and 2-methyltetrahydrofuran, may be used, which can solubilize the first solid material. Also, thioethers such as tetrahydrothiophene can be used. In some instances, such as the use of 2,2,5,5-tetrahydrofuran and tetrahydropyran-2-methanol, reprecipitation occurs upon heating to about 130°–185° F. Other compounds may be used which act in an equivalent manner, i.e., materials which can solubilize the first solid and from which solid uniform particles can be reprecipitated, such as cyclohexene oxide, cyclohexanone, ethyl acetate and phenyl acetate. Mixtures of suitable materials may be used.

In another aspect of this invention, the reprecipitated solid is treated with a titanium(IV) compound in the presence of a suitable electron donor. The preferable procedure is a two-step method by which the reprecipitated solid is treated first with a Ti(IV) component and then with the Ti(IV) component combined with a suitable electron donor. Although, typically, solid is separated from the first Ti(IV)-containing solution before a second treatment with Ti(IV) component and electron donor, an alternative procedure can be to react the reprecipitated solid with Ti(IV) compound and then add the electron donor.

Organic electron donors useful in preparation of stereospecific supported catalyst components many times can be organic compounds containing one or more atoms of oxygen, nitrogen, sulfur, and phosphorus. Such compounds include organic acids, organic acid esters, alcohols, ethers, aldehydes, ketones, amines, amine oxides, amides, thiols and various phosphorous acid esters and amides, and like. Mixtures of organic electron donors can be used if desired. Specific examples of useful oxygen-containing electron donor compounds include organic acids and esters. Useful organic acids contain from 1 to about 20 carbon atoms and 1 to about 4 carboxyl groups.

The preferred electron donor compounds include esters of aromatic acids. Preferred organic electron donors according to this invention are $C_1$–$C_6$ alkyl esters of aromatic mono- and dicarboxylic acids and halogen-, hydroxyl-, oxo-, alkyl-, alkoxy-, aryl-, and aryloxy-substituted aromatic mono- and dicarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl-p-toluate. An especially preferred aromatic ester is a dialkylphthalate ester in which the alkyl group contains from about two to about ten carbon atoms. Examples of preferred phthalate ester are diisobutylphthalate, diethylphthalate, ethylbuytlphthalate, and di-n-butylphthalate.

Titanium(IV) compounds useful in treating the reprecipitated solid particles of this invention are titanium halides and haloalcoholates having 1 to about 20 carbon atoms per alcoholate group. Mixtures of titanium compounds can be employed if desired. Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

The electron donor component used in preparation of the solid catalyst component is used in an amount ranging from about 0.001 to about 1.0 mole per gram atom of titanium, and preferably from about 0.005 to about 0.8 mole per gram atom. Best results are achieved when this ratio ranges from about 0.01 to about 0.6 mole per gram atom of titanium.

Typical suitable diluents useful in this invention are aromatic or substituted aromatic liquids, although other hydrocarbon-based liquids may be used. Aromatic hydrocarbons, such as toluene, and substituted aromatics, such as chlorobenzene, have been found suitable. Another suitable diluent is a halogenated aromatic such as chlorobenzene or a mixture of a halogenated aromatic such as chlorobenzene and a halogenated aliphatic such as dichloroethane. Also useful are higher boiling aliphatic liquids such as kerosine. Mixtures of diluents may be used. One useful diluent component is Isopar G which is a $C_{10}$-average isoparaffinic hydrocarbon boiling at 156°–176° C. A suitable diluent should boil at a high enough temperature to promote reaction and not adversely affect resulting catalyst performance.

Other examples of useful diluents include alkanes such as hexane, cyclohexane, ethylcyclohexane, heptane, octane, nonane, decane, undecane, and the like; haloalkanes such as 1,2-dichloroethane, 1,1,2-trichloroethane, carbon tetrachloride and the like; aromatics such as benzene, toluene, xylenes and ethylbenzene; and halogenated and hydrogenated aromatics such as chlorobenzene and o-dichlorobenzene.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III–V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiC_4$. Mixtures of Lewis acids can be employed if desired. Such Lewis acid may be used in a compatible diluent.

Although not required, the above-described solid reaction product may be washed with an inert liquid hydrocarbon or halogenated hydrocarbon before contact with a Lewis acid. If such a wash is conducted it is preferred to substantially remove the inert liquid prior to contacting the washed solid with Lewis acid.

Although the chemical structure of the catalyst components described herein is not presently known, the components preferably contain from about 1 to about 6 wt. % titanium, from about 10 to about 25 wt. % magnesium, and from about 45 to about 65 wt. % halogen. Preferred catalyst components made according to this invention contain from about 1.0 to about 3 wt. % titanium, from about 15 to about 21 wt. % magnesium and from about 55 to about 65 wt. % chlorine.

One unusual aspect of the titanium-containing component particles prepared according to the preferred method of this invention is that the particles have a cubic shape.

The titanium-containing catalyst component of this invention may be prepolymerized with an alpha-olefin before use as a polymerization catalyst component. In prepolymerization, catalyst and an organoaluminum compound cocatalyst such as triethylaluminum are contacted with an alpha-olefin such as propylene under polymerization conditions, preferably in the presence of a modifier such as a silane and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity, stereospecificity, and attrition resistance. A particularly useful prepolymerization procedure is described in U.S. Pat. No. 4,579,836, incorporated herein by reference.

The titanium-containing catalyst component of this invention is used in a polymerization catalyst containing a cocatalyst component including a Group II or III metal alkyl and, typically, one or more modifier compounds.

Useful Group II and IIIA metal alkyls are compounds of the formula $MR_m$ wherein M is a Group II or IIIA metal, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, hexyl, decyl, tetradecyl, and eicosyl.

From he standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)(C_8H_{17})$, $Zn(C_6H_{13})_2$, $Zn(C_{12}H_{25})_2$, $Al(CH_3)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride, diisobutylaluminum hydride, and the like.

A typical catalyst composition is formed by combining the supported titanium-containing compound described in this invention and an alkyl aluminum compound together with modifiers including an electron donor and, preferably, a silane. Typically, useful aluminum-to-titanium atomic ratios in such catalyst formulations are about 10 to about 500 and preferably about 30 to about 300. Typical aluminum compound-to-electron donor molar ratios are about 5 to about 40. Typical aluminum-to-silane compound molar ratios are about 8 to about 30.

To maximize catalyst activity and stereospecificity, it is preferred to incorporate one or more modifiers, typically electron donors, and including compounds such as silanes, mineral acids, organometallic chalcogenide derivatives of hydrogen sulfide, organic acids, organic acid esters and mixtures thereof.

Organic electron donors useful as cocatalyst modifiers useful in this invention are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors can be employed if desired.

Preferred organic acids and esters are benzoic acid, halobenzoic acids, phthalic acid, isophthalic acid, terephthalic acid, and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate,, methyl anisate, ethyl anisate, methyl p-toluate, hexyl benzoate, and cyclohexyl benzoate, and diisobutyl phthalate as these give good results in terms of activity and stereospecificity and are convenient to use.

The polymerization cocatalyst useful in this invention advantageously contains an aliphatic or aromatic silane modifier. Preferable silanes useful in cocatalysts in this invention include alkyl-, aryl-, and/or alkoxy-substituted silanes containing hydrocarbon moieties with one to about 20 carbon atoms. Especially preferred are silanes having a formula: $SiR_4$, wherein R is independently R' or OR' with R' having 1 to about 20 carbon atoms. Preferred aromatic silanes include diphenyldimethoxysilane, phenyltrimethoxysilane, phenylethyldimethoxysilane and methylphenyldimethoxysilane. Preferred aliphatic silanes include isobutyltrimethoxysilane, diisobutyldimethoxysilane, diisopropyldimethoxysilane, di-t-butyldimethoxysilane, and t-butyltrimethoxysilane.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.02 milligrams of catalyst to gram of polymer produced.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not be below the vapor pressure at the polymerization temperature of the alpha-olefin to be polymerized.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is useful include both stirred bed reactors and fluidized bed reactor systems and are described in U.S. Pat. Nos. 3,957,448; 3,965,083; 3,971,768; 3,970,611; 4,129,701; 4,101,289; 3,652,527; and 4,003,712, all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid which can be liquid monomer, can be added to polymerizing olefin through the recycle gas system in order to control temperature.

Irrespective of polymerization technique, polymerization is carried out under conditions that exclude oxygen, water, and other materials that act as catalyst poisons.

Also, according to this invention, polymerization can be carried out in the presence of additives to control polymer molecular weights. Hydrogen is typically employed for this purpose in a manner well known to persons of skill in the art.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

The invention described herein is illustrated, but not limited, by the following Examples and Comparative Runs.

EXAMPLE 1

Step A—Formation of Magnesium Carboxylate Solution

Into a one-liter reactor, equipped with a mechanical stirrer and flushed with dry nitrogen, was transferred a mixture of 150 grams of magnesium ethoxide, 275 milliliters of 2-ethyl-1-hexanol and 300 milliliters of toluene. This mixture was agitated at 450 rpm under 30 psig of carbon dioxide and heated at 93° C. for three hours. The resulting solution was transferred to a two-liter bottle and diluted with 400 milliliters of toluene and 400 milliliters of n-decane. The total volume of this solution was 1520 milliliters. The solution contained 0.10 gram-equivalents of magnesium ethoxide per milliliter.

Step B—Formation of Solid Particles

Into a one-liter reactor was charged 100 milliliters of toluene, 30 milliliters of chlorobenzene, 9 of milliliters tetraethoxysilane, 8.5 of milliliters titanium tetrachloride and 100 milliliters of Isopar G (a $C_{10}$-average isoparaffinic hydrocarbon, b.p. 156°–176° C.) under a blanket of dry nitrogen. After the mixture was stirred at 600 rpm at 26°–30° C. for five minutes, 50 milliliters of the Step A magnesium carbonate solution were added to the reactor through a syringe. Solid particles precipitated.

Step C—Reprecipitation of Solid Particles

After the mixture containing the precipitate was stirred for five additional minutes, 22 of milliliters tetrahydrofuran (THF) were added rapidly through a syringe. Thereupon, the stirring was increased to 1500 rpm and the temperature rose to 60° C. within 15 minutes. The first formed solid dissolved in the THF solution. Within about ten minutes after the THF addition, a solid began to reprecipitate from solution. Solid formation was complete within about five minutes. Stirring was continued for 45 minutes at 60° C. after which agitation was stopped and the resulting solid was allowed to settle. Supernatant was decanted and the solid washed twice with 250-milliliter portions of toluene.

Step D—Titanium(IV) Compound Treatment

To the solid from Step C in the one-liter reactor were added 200 of milliliters chlorobenzene and 100 of milliliters titanium tetrachloride. The resulting mixture was heated to 135° C. within 30 minutes and stirred at 1500 rpm for one hour. After stirring was stopped, the resulting solid was allowed to settle and the supernatant was decanted. After 250 of milliliters chlorobenzene, 100 milliliters of titanium tetrachloride and 2.1 milliliters of di-n-butylphthalate were added to the resulting solid, the mixture was stirred at 600 rpm at 135° C. for 90 minutes. Supernatant liquid was decanted and the residue washed three times with 200-milliliter portions of toluene and four times with 200-milliliter portions of Isopar G and twice with 200-milliliter portions of hexane. A total of 3.2 grams of solid was recovered. Analysis of this solid product showed 55.1 wt. % chlorine, 16.8 wt. % magnesium, 2.3 wt. % titanium and 7.3 wt. % di-n-butylphthalate.

EXAMPLE 2

Another catalyst component was prepared in a manner similar to that described in Example I, except that tetraethoxysilane was added after the magnesium carbonate solution reaction with titanium tetrachloride in Step B and the reprecipitation from THF was carried out under 20 psig of carbon dioxide.

EXAMPLE 3

Another catalyst component was prepared in a manner similar to that described in Example 1, except that in Step B 300 milliliters of toluene, 60 milliliters of chlorobenzene, 18 milliliters of tetraethoxysilane, and 17.5 milliliters of titanium tetrachloride were used. The resulting solid particles were reprecipitated from 44 milliliters of THF. The reprecipitated solid particles were treated first with 200 milliliters of chlorobenzene and 4.2 milliliters of titanium tetrachloride and then with 300 milliliters of chlorobenzene, 100 milliliters of titanium tetrachloride and 4.2 milliliters of di-n-butylphthalate.

EXAMPLE 4

Another catalyst component was prepared in a manner similar to that described, except that in Step D the reprecipitated solid particles were treated once with 100 milliliters of chlorobenzene, 100 milliliters of titanium tetrachloride and 2 milliliters of di-n-butylphthalate.

EXAMPLE 5

Another catalyst component was prepared in a manner similar to that described in Example 1, except that in Step B 100 milliliters of toluene, 200 milliliters of chlorobenzene, 18 milliliters of trimethylethoxysilane, and 17.5 milliliters of titanium tetrachloride were used. In Step D, the reprecipitated solid particles were treated once with 200 milliliters of chlorobenzene, 200 milliliters of titanium tetrachloride and 5 milliliters of di-n-butylphthalate.

RUN A

Another catalyst component was prepared in a manner similar to that described in Example 1, except that in Step B no silane was used and in Step C the reprecipitated solid particles were treated once with 200 milliliters of chlorobenzene, 100 milliliters of titanium tetrachloride, and 2 milliliters of di-n-butylphthalate. The particle size distribution of the resulting catalyst component was random with a large portion of small and large particles.

RUN B

Another catalyst component was prepared in a manner similar to that described in Example 1, except that the particles of Step B were were separated by filtering and washed twice with hexane. Six grams of such dried particles were suspended in 200 milliliters of chlorobenzene, 100 milliliters titanium tetrachloride and 2.5 milliliters di-i-butylphthalate in a one-liter reactor and mixed for one hour at 800 rpm. After the agitation was stopped, supernatant was removed and 200 milliliters of titanium tetrachloride were added and stirring continued for one hour at 137°–143° C., followed by three toluene and three hexane washes.

EXAMPLE 6

Another catalyst component was prepared in a manner similar to that described in Example 1, except that in Step A 30 grams of magnesium ethoxide were charged to a 450-milliliter pressure bottle and toluene was added to the 300-milliliter mark. The resulting suspension was stirred overnight at ambient temperature under 30 psig carbon dioxide. In Step B, 100 milliliters of toluene, 13 milliliters of trimethylethoxysilane, 8.75 milliliters titanium tetrachloride, 100 milliliters of Isopar G and 50 milliliters of the suspension of Step A were stirred at 600 rpm at ambient temperature. After about five minutes, 22 milliliters of THF were added and a clear solution was obtained. Within about 15 minutes the temperature increased to 66° C. and a solid precipitated slowly after about ten minutes. The temperature was maintained at 66° C. for 30 minutes.

EXAMPLE 7

Another catalyst component was prepared in a manner similar to that described in Example 1, except that 10 grams of magnesium ethoxide, 200 milliliters of chlorobenzene, 100 milliliters of toluene, 18 milliliters of tetraethoxysilane, 15 milliliters of 2-ethyl-1-hexanol, and 17.5 milliliters of titanium tetrachloride were charged to a one-liter reactor. The resulting suspension was reacted with 44 milliliters of THF under agitation at ambient temperature and a clear solution was obtained. The procedure of Example 1 then was followed.

RUN C

Another catalyst component was prepared in a manner similar to that described in Example 7, except that no 2-ethyl-1-hexanol was added. Although pulverized magnesium ethoxide was used, the solid did not dissolve as observed in the previous examples even with 50% more THF.

EXAMPLE 8

Another catalyst component was prepared in a manner similar to that described in Example 1, except that in Step B 170 milliliters of toluene, 35 milliliters of Isopar G, 20.5 milliliters of tetraethoxysilane, 19.4 milliliters of titanium tetrachloride, and 114 milliliters of the magnesium-containing solution were used. The resulting solid particles were reprecipitated from 50 milliliters of THF. The reprecipitated solid particles were treated first with 200 milliliters of toluene and 100 milliliters of titanium tetrachloride and then with 250 milliliters of toluene, 100 milliliters of titanium tetrachloride and 4.2 milliliters of di-n-butylphthalate. The resulting solid was washed three times with hot toluene, twice with hot Isopar G and twice with hot hexane. The resulting uniform spheroidal particles had an average particle size of 18 microns.

EXAMPLE 9

Another catalyst component was prepared in a manner similar to that described in Example 8, except that a three-liter jacketed stainless steel autoclave equipped with baffles and a magnet-driven agitator was used. The reactants were 1190 milliliters of toluene, 350 milliliters of Isopar G, 144 milliliters of tetraethoxysilane, 136 milliliters of titanium tetrachloride, and 798 milliliters of the magnesium-containing solution were used. The resulting solid particles were reprecipitated from 350 milliliters of THF. The reprecipitated solid particles were treated first with 1400 milliliters of chlorobenzene and 700 milliliters of titanium tetrachloride and then with 1750 milliliters of chlorobenzene, 700 milliliters of titanium tetrachloride and 29.4 milliliters of di-n-butylphthalate. The resulting solid was washed with 500-milliliter portions of toluene, Isopar G, and hexane. A total of 75 grams of solid was recovered.

GAS-PHASE POLYMERIZATION

A series of batch gas phase propylene polymerizations were performed using the titanium-containing components prepared in Examples 1-9 in a 2.5-liter reactor at 71° C. at 300 psig including 36 mmole of hydrogen with stirring at 40 rpm with a reaction time of 2 hours. Triethylaluminum (TEA) was used as a cocatalyst together with diphenyldimethoxysilane (DPDMSi) as a modifier. The reactor was charged with TEA/modifier, titanium component, hydrogen, and propylene in that order. Results are shown in Table I.

"Yield" (grams of polymer produced per gram of solid catalyst component) was determined by magnesium analysis of the polymer product and in some cases based on the weight of solid catalyst used to polymer produced. "Extractables" were determined by measuring the loss in weight of a dry sample of ground polymer after being extracted in boiling n-hexane for four to six hours.

TABLE I

| | Gas-Phase Polymerization Performance | | | | |
|---|---|---|---|---|---|
| Example (Run) | Cocatalyst System[1] | Yield (g/g) | Extractables (wt. %) | Bulk Density (lbs/ft$^3$) | Melt Flow Rate (g/10 min.) |
| 1 | a | 24,000 | 1.2 | 29.0 | 1.7 |
| 2 | b | 24,700 | 1.2 | 29.7 | 1.4 |
| 3 | b | 28,900 | 1.0 | 29.4 | 2.3 |
| 4 | a | 10,100 | 3.5 | 28.2 | 3.4 |
| 5 | a | 13,500 | 1.6 | 29.7 | 2.2 |
| (A) | a | 10,100 | 2.0 | 27.2 | 1.6 |
| (B) | c | 8,200 | 1.4 | 26.0 | 2.1 |
| 6 | c | 14,000 | 2.4 | 29.0 | 1.5 |
| 7 | b | 21,300 | 1.5 | 27.8 | 2.7 |
| 8 | a | 23,500 | 1.0 | 29.0 | 2.8 |
| 9 | a | 22,600 | 1.1 | 29.0 | 3.5 |

[1]Cocatalyst Systems
TEA/DPDMSi/Ti Molar Ratios:
a = 100/8/1
b = 200/20/1
c = 100/10/1

TABLE II

| Polymer Particle Size Distribution | |
|---|---|
| Size (microns) | Percent of Total Weight (Example 1) |
| >850 | 3.8 |
| 600-850 | 27.5 |
| 425-600 | 56.2 |
| 150-425 | 12.3 |
| <150 | 0.2 |

EXAMPLES 10-12

Another catalyst component (Ex. 10) was prepared in a manner similar to that described in Example 1. In Step A 11.4 grams of magnesium ethoxide, 175 milliliters toluene and 21 milliliters of 2-ethyl-1-hexanol were charged into a 450-milliliter pressure bottle and the resulting suspension was stirred overnight at ambient temperature under 25 psig of carbon dioxide. In Step B, 80 milliliters toluene, 20.5 milliliters tetraethoxysilane, 19.4 milliliters titanium tetrachloride and 35 milliliters Isopar G were stirred with the entire contents of Step A for five minutes at 1500 rpm at ambient temperature. In Step C, 50 milliliters of THF were used to effect reprecipitation and the resulting solid was washed twice with 80-milliliter portions of toluene. In Step D, the amount of di-n-butylphthalate used was 4.2 milliliters and the resultant solid was washed twice with 80-milliliter portions of toluene, three times with 80-milliliter portions of Isopar G, and twice with 80-milliliter portions of hexane. A total of 2.8 grams of solid was recovered. Analysis of the solid product showed 60.4 wt. % chlorine, 19.7 wt. % magnesium, 1.92 wt. % titanium, 9.0 wt. % di-n-butylphthalate, and 1.2 wt. % THF.

Another catalyst component (Ex. 11) was prepared in a manner identical to Example 10 except that in Step D, the first treatment with 200 milliliters of chlorobenzene was replaced by one treatment with 200 milliliters of toluene. A total of 7.4 grams of solid was recovered. Analysis of the solid product showed 61.0 wt. % chlorine, 20.1 wt. % magnesium, 1.87 wt. % titanium, 9.6 wt. % di-n-butylphthalate, and 0.2 wt. % THF.

Another catalyst component (Ex. 12) was prepared in a manner identical to Example 10. A total of 9.0 grams of solid was recovered. Analysis of the solid product showed 58.0 wt. % chlorine, 16.8 wt. % magnesium, 1.65 wt. % titanium, and 10.2 wt. % di-n-butylphthalate.

The titanium-containing catalyst components prepared above were tested in batch hexane-slurry propylene polymerizations. A two-liter Parr reactor was charged with 650 milliliters of hexane, 150 psig of propylene, and 4 psig of hydrogen. About 15 milligrams of titanium-containing catalyst component together with a triethylaluminum (TEA)-based cocatalyst system including diphenyldimethoxysilane (DPDMSi) were used in the polymerization test run for two hours at 71° C. Results are shown in Table III. Particle size distributions of catalyst formed from polymerizations of Examples 10–12 are shown in Table IV.

TABLE III

| | Slurry Polymerization Performance | | | | |
|---|---|---|---|---|---|
| Example (Run) | Cocatalyst System[1] | Yield (g/g) | Extractables (wt. %) | Hexane Solubles (wt. %) | Bulk Density (lbs/ft³) |
| 10 | a | 14,800 | 3.0 | 1.8 | 24 |
| 10 | b | 15,600 | 1.4 | 0.7 | 24 |
| 11 | b | 13,700 | 1.0 | 0.4 | 27 |
| 12 | a | 13,200 | 0.3 | 1.0 | 28 |
| 12 | b | 14,300 | 0.2 | 0.6 | 30 |
| 12 | c | 10,400 | — | 1.0 | 27 |

[1]Cocatalyst Systems
Molar Ratios:
a: TEA/DPDMSi = 20/1 Al/Ti = 125/1
b: TEA/DPDMSi = 20/1 Al/Ti = 550/1
c: TEA/DPDMSi = 10/1 Al/Ti = 550/1

TABLE IV

| | Polymer Particle Size Distribution | | |
|---|---|---|---|
| Size | Percent of Total Weight | | |
| (microns) | (Ex. 10a) | (Ex. 10b) | (Ex. 11) |
| >850 | 0.5 | 0.3 | 0.4 |
| 425–850 | 4.6 | 4.1 | 3.5 |
| 250–425 | 85.9 | 86.8 | 83.8 |
| 180–250 | 7.5 | 6.8 | 8.2 |
| 150–180 | 0.8 | 0.6 | 1.7 |
| 75–150 | 0.4 | 0.6 | 2.0 |
| <150 | 0.2 | 0.8 | 0.3 |

EXAMPLES 13–16

A series of batch bulk polymerizations was performed using the titanium-containing components prepared in Example 1. A two-liter Parr reactor, purged with propylene, was charged with hydrogen (10 psig) and 1000 milliliters of liquid propylene. A premixed catalyst/cocatalyst/modifier package was washed into the reactor with 300 milliliters of additional propylene. The TEA/DPDMSi/Ti molar ratio was 200/10/1. For one hour runs, 10 milligrams of titanium-containing component were used, while for two-hour runs, 8 milligrams were used. The reactor was closed and heated to 70° C. for one to two hours at 480 psig. Results are shown in Table V.

TABLE V

| | Bulk Polymerization Performance | | | |
|---|---|---|---|---|
| Example | Time (hr) | Yield (g/g) | Extractables (wt. %) | Bulk Density (lbs/ft³) | Melt Flow Rate (g/10 min.) |
| 13 | 1 | 33,300 | 1.9 | 25.0 | 1.4 |
| 14 | 1 | 34,000 | 1.8 | 24.7 | 1.2 |
| 15 | 2 | 48,800 | — | 24.0 | — |
| 16 | 2 | 51,900 | — | 22.3 | — |

EXAMPLE 17

A magnesium carbonate solution was prepared as described in Example 1 in a one-liter reactor. Into the one-liter reactor under a nitrogen atmosphere was charged 150 milliliters toluene, 35 milliliters Isopar G, 20.5 milliliters tetraethoxysilane, and 19.4 milliliters titanium tetrachloride. The mixture was maintained at 24°–29° C. and stirred at 600 rpm for five minutes. A solid formed and the mixture was agitated for five additional minutes. THF (50 milliliters) was added rapidly with a syringe and the first solid dissolved completely. Agitation was increased to 1200 rpm and the temperature increased to 60° C. within 15 minutes. About 10 minutes after the THF addition, a solid appeared slowly in the mixture and solid formation was complete in about five minutes. After heating for one hour at 60° C., agitation was stopped and the resulting solid allowed to settle for about ten minutes. Under a nitrogen atmosphere, the supernatant was decanted at 38°–50° C. and the solid washed twice with 50-milliliter portions of toluene. To the washed solid, 125 milliliters toluene and 50 milliliters titanium tetrachloride were added and the resulting mixture heated to 135° C. within 30 minutes. The mixture was stirred at 800 rpm for one hour at 120° C., after which agitation was stopped, solid allowed to settle and the supernatant decanted. To the solid were added 150 milliliters of toluene, 50 milliliters of titanium tetrachloride, and 2.8 milliliters of di-n-butylphthalate, and the mixture was heated for 90 minutes at 120° C. with stirring at 800 rpm. After the stirring was stopped, the solid was allowed to settle and the supernatant decanted. An additional 95 milliliters of toluene were added and the mixture was refluxed with agitation for 20 minutes. Agitation was stopped, the solid was allowed to settle and the supernatant was decanted. An additional 125 milliliters of titanium tetrachloride was added and the resulting suspension was agitated and heated to reflux for 20 minutes. The resulting solid was washed four times with 50-milliliter portions of hexane and transferred to a dry box flushed with nitrogen as hexane suspension. Solid catalyst component was filtered and dried.

A portion of the catalyst component was used to polymerize propylene as described for Examples 1–9. The TEA/DPDMSi/Ti molar ratio was 200/20/1. The results were: Yield 22,125 g/g; Extractables 1.6 wt. %; Bulk Density 28.5 lbs/ft₃; and Melt Flow Rate 4.6 g/10 min.

EXAMPLE 18

Another catalyst component was prepared in a manner similar to Example 1, except to the solid from Step C, 200 milliliters of toluene and 100 milliliters of titanium tetrachloride were added and the resulting mixture was stirred at 500 rpm for one hour at 110° C. To this mixture was added slowly a mixture of 50 milliliters of toluene and 3.0 milliliters of di-n-butylphthalate. The resulting mixture was stirred for 1.5 hours and the supernatant decanted. An additional 150 milliliters of toluene was added and the mixture was stirred for 30 minutes with the temperature reaching 93°-96° C. The supernatant was decanted again and 125 milliliters of toluene was added and the resulting mixture stirred for 30 minutes with the temperature reaching 110° C. Supernatant was decanted and the remaining solid was washed once with 100 milliliters of toluene and four times with 100-milliliter portions of hexane. The solid was filtered and dried. Propylene polymerization tests were performed using the batch gasphase polymerization technique described previously with a TEA/DPD-MSi/Ti mole ratio=200/20/1. The results were: Yield=24,125 g/g; Extractables=1.8 wt. %; Bulk Density=27.9 lbs/ft$_3$; MFR=4.1.

EXAMPLE 19

Another catalyst component was prepared in a manner similar to Example 4, except that 20 milliliters of tetrahydropyran were used instead of THF. Slurry propylene polymerization results using a TEA/DPD-MSi/Ti molar ratio of 200/10/1 were: Yield 7,200 g/g; Extractables 0.4 wt. %.

EXAMPLE 20

Under a dry nitrogen atmosphere, a 450-milliliter pressure bottle with a a magnetic stirring bar was charged with 11.25 grams of magnesium ethoxide. After the bottle was capped with a rubber septum, 120 milliliters of toluene and 20 milliliters of 2-ethyl-1-hexanol were added by syringe. A pressure of 25 psig of carbon dioxide was added through the syringe needle and the resulting mixture was stirred under carbon dioxide pressure for about 16 hours. After carbon dioxide was vented, hexane was added to the bottle until the total volume was 300 milliliters and the contents were kept under nitrogen atmosphere (Solution A). A 500-milliliter resin kettle fitted with a a 125-milliliter dropping funnel was purged with dry nitrogen and filled with 50 milliliters toluene, 5.6 milliliters titanium tetrachloride, and 13.6 milliliters trimethylchlorosilane. The resulting bright orange solution (Solution B) was stirred briefly with a glass rod.

The 500-milliliter resin kettle fitted with a dropping funnel also was fitted with a mechanical stirrer and temperature probe. After the kettle was purged with dry nitrogen, 100 milliliters of Solution A was added using a cannula. The orange Solution B then was added with stirring at 450 rpm over 35-60 minutes. The resulting solution turned opalescent, then white, and finally slightly yellow. When the addition was complete, stirring continued for one hour at 60° C. at 450 rpm. After heating was stopped and a solid was allowed to settle, supernatant was decanted. The solid was washed three times with 75-milliliter portions of toluene and twice with 100-milliliter portions of hexane. The washed solid was filtered and dried. The yield was 3.5 grams.

To the resin kettle, equipped with a mechanical stirrer, was added the dried solid, 150 milliliters of chlorobenzene, and 50 milliliters of titanium tetrachloride. While the resulting mixture was stirring at 450 rpm, 1.3 milliliters of diisobutylphthalate was added dropwise. The temperature was increased and the mixture refluxed at 130° C. for 90 minutes. Heating was stopped and the mixture was stirred for about three minutes and then allowed to settle for about five minutes. The warm supernatant was decanted and the remaining solid was washed three times with 75-milliliter portions of toluene and twice with 100-milliliter portions of hexane. The resulting solid (2.2 grams) was filtered and dried. Slurry polymerization tests as described in Example 10-12 were performed using the solid catalyst component. Results are shown in Table VI.

RUNS F AND G

A catalyst component (Run F) was prepared in a manner similar to that described in Example 20, except Solution B contained 39.0 milliliters of trimethylchlorosilane and 50 milliliters of toluene. Another catalyst component (Run G) was prepared in a manner similar to that described in Example 20, except Solution B contained 8.44 milliliters of titanium tetrachloride and 50 milliliters of toluene. Slurry polymerization tests as described in Examples 10-12 were performed using the solid catalyst component. Results are shown in Table VI.

TABLE VI

| Example (Run) | Cocatalyst System[1] | Yield (g/g) | Extractables (wt. %) | Hexane Solubles (wt. %) | Bulk Density (lbs/ft$^3$) |
|---|---|---|---|---|---|
| 20 | a | 12,300 | 1.2 | 0.5 | 22 |
| 20 | b | 11,500 | 1.3 | 1.0 | 23 |
| F | a | 4,000 | — | 2.0 | — |
| F | b | 3,100 | 7.6 | 6.5 | — |
| G | b | 11,900 | 0.8 | 0.6 | 21 |

Cocatalyst Systems
Molar Ratios:
a: TEA/DPDMSi = 10/1 Al/Ti > 450/1
b: TEA/DPDMSi = 20/1 Al/Ti > 450/1

EXAMPLE 21

A catalyst component was prepared by a procedure similar to that described in Example 17. Propylene was polymerized using the batch gas phase technique described for Examples 1-9 except that diisobutyldimethoxysilane (DIBDMSi) was used as a polymerization modifier with a molar ratio of components of TEA/DIBDMSi/Ti=200/20/1. The results were: Yield=22,100 g/g; Extractables=1.4%; Bulk Density=28.4 lbs/ft$^3$; MFR=4.6.

EXAMPLE 22

A catalyst component was prepared by a procedure similar to that described in Example 17, except that 2-methyltetrahydrofuran was used. Slurry polymerization tests as described in Example 10-12 were performed using the solid catalyst component. The results were: Yield=20,162 g/g; Solubles=8.2% Extractables=2.8%; Bulk Density=23.9 lbs/ft$^3$; MFR=3.8.

EXAMPLE 23

A catalyst component was prepared by a procedure similar to that described in Example 20 using sulfur dioxide instead of carbon dioxide. Propylene was polymerized using the batch gas phase technique described for Examples 1-9 except that a molar ratio of components of TEA/DPDMSi/Ti=100/10/1. The results were: Yield=8,500 g/g; Extractable=1.3%; Bulk Density=27.7 lbs/ft$^3$; MFR=2.2.

What is claimed is:

1. A solid, hydrocarbon-insoluble alpha-olefin polymerization catalyst component comprises a product formed by:
   A. forming a solution of a magnesium-containing species from a magnesium carbonate or a magnesium carboxylate;
   B. precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R, or a halogen:
   C. reprecipitating such solid particles from a mixture containing a cyclic ether; and
   D. treating the reprecipitated particles with a transition metal compound and an electron donor.

2. The catalyst component of claim 1 wherein the magnesium carbonate solution is formed from a magnesium alkoxide and carbon dioxide.

3. The catalyst component of claim 2 wherein the magnesium alkoxide is solubilized with an alcohol.

4. The catalyst hilide of claim 1 wherein the transition metal hilide in Step B is a titanium hilide.

5. The catalyst component of claim 1 wherein the transition metal hilide in Step B is a titanium tetrachloride.

6. The catalyst component of claim 1 wherein the transition metal compound in Step D is a titanium tetrachloride.

7. The catalyst compound of claim 1 wherein the cyclic ether is tetrahydrofuran, tetrahydropyran or 2-methyltetrahydrofuran 8. The catalyst component of claim 1 wherein the organosilane is trimethylchlorosilane, trimethylethoxysilane, dimethyldichlorosilane or tetraethoxysilane.

9. The catalyst component of claim 1 wherein the particles from the Step D are treated with titanium tetrachloride and then with titanium tetrachloride in the presence of an electrode donor.

10. A solid, hydrocarbon-insoluble alpha-olefin polymerization catalyst component comprises a product formed by:
    A. forming a solution in an alcohol medium of a magnesium containing species formed from a magnesium alkoxide and carbon dioxide.
    B. precipitating solid particles from such magnesium-containing solution by treatment with a titanium halide and an organosilane having a formula: $R_nSiR'_{4-n}$ wherein n=0 to 4 and wherein R is hydrogen or an alkyl, a haloalkyl or aryl radical containing one to about ten carbon atoms of a halosilyl radical or haloalkylsilyl radical containing one to about eight carbon atoms, and R, is OR or a halogen:
    C. reprecipitating such solid particles from a mixture containing a cyclic ether; and
    D. treating the reprecipitated particles with a Ti(IV) compound and then with a mixture of a Ti(IV) compound and an electron donor.

11. The catalyst component of claim 10 wherein the titanium halide in Step B is a titanium tetrachloride.

12. The catalyst component of claim 11 wherein the cyclic ether in Step C is tetrahydrofuran.

13. The catalyst component of claim 12 wherein the Ti(IV) compound in Step D is a titanium tetrachloride.

14. The catalyst component of claim 13 wherein the organosilane is trimethylchlorosilane, trimethylethoxysilane, dimethyldichlorosilane or tetraethoxysilane.

15. The catalyst component of claim 14 wherein the electron donor in Step D is a dialkylphthalate ester.

16. The catalyst component of claim 15 wherein the electron donor in Step D is diisobutylphthalate, diethylphthalate or di-n-butylphthalate.

17. The catalyst component of claim 16 wherein in Step A the alcohol is 2-ethyl-1-hexanol, the organosilane in Step B is tetraethoxysilane, and the electron donor in Step D is di-n-butylphthalate, diisobutylphthalate or mixtures thereof.

18. The catalyst component of claim 17 wherein the electron donor in Step D is di-n-butylphthalate.

19. A solid, hydrocarbon-insoluble alpha-olefin polymerization catalyst comprises a product formed by precipitating solid particles from a magnesium hydrocarbyl carbonate solution in an alcohol by treatment with titanium tetrachloride and an organosilane having a formula: $R_nSiR'_{4-n}$, wherein n=1 to 4 and wherein R is hydrogen or an alkyl, a haloalkyl or aryl radical containing one to about ten carbon atoms or a halosilyl radical or haloalkylsilyl radical containing one to about eight carbon atoms, and R, is OR or a halogen and treating the resulting solid particles with titanium tetrachloride and an electron donor.

20. The catalyst component of claim 19 wherein the organosilane is trimethylchlorosilane, dimethyldichlorosilane or tetraethoxysilane.

21. The catalyst component of claim 19 wherein the electron donor is a dialkylphthalate ester.

22. The catalyst component of claim 19 wherein the electron donor is diisobutylphthalate, diethylphthalate, or di-n-butylphthalate.

23. The catalyst component of claim 19 wherein the magnesium hydrocarbyl carbonate solution is formed from a magnesium alkoxide and carbon dioxide.

24. The catalyst component of claim 19 wherein the magnesium hydrocarbyl carbonate solution is formed from magnesium ethoxide and carbon dioxide in 2-ethylhexanol.

25. An alpha-olefin polymerization catalyst comprising the solid component of claim 1, an alkylaluminum compound, and an organosilane.

26. The catalyst component of claim 1 wherein the transition metal compound in Step D is a titanium(IV) compound.

27. The catalyst component of claim 13 wherein in Step A the magnesium alkoxide is magnesium ethoxide.

28. The catalyst component of claim 1 wherein the cyclic ether in Step C is a thioether.

29. The catalyst component of claim 1 wherein the cyclic ether in Step C is tetrahydrothiophene, 2,2,5,5-tetrahydrofuran or tetrahydropyran-2-methanol.

30. The catalyst component of claim 1 wherein cyclohexane oxide, cyclohexanone, ethyl acetate or phenyl acetate is used as a reprecipitation medium in Step C.

* * * * *

UNITED STATES PATENT OFFICE
CERTIFICATE OF CORRECTION

Patent No. 4,866,022          Dated September 12, 1989

Inventor(s) ARZOUMANIDIS et al.

It is certified that error appears in the above-identified patent and that said Letters Patent is hereby corrected as shown below:

| Column | Line | |
|---|---|---|
| 19 | 4  | "Extractable" should read --Extractables-- |
| 19 | 17 | "$R_nSiR'_{4"n}$" should read --$R_nSiR'_{4-n}$-- |
| 19 | 21 | "R, or" should read --R' is OR-- |
| 19 | 32 | "The catalyst hilide" should read --The catalyst compound-- |
| 19 | 33 | "hilide" should read --halide-- |
| 19 | 33 | "hilide" should read --halide-- |
| 19 | 35 | "hilide" should read --halide-- |
| 19 | 43 | "2-methyltetrahydrofuran" should read --2-methyltetrahydrofuran.-- |
| 19 | 50 | "electrode" should read --electron-- |
| 19 | 55 | "magnesium containing" should read --magnesium-containing-- |
| 19 | 61 | "of a" should read --or a-- |
| 19 | 64 | "R," should read --R'-- |
| 19 | 56 | "dioxide." should read --dioxide;-- |
| 19 | 66 | "halogen:" should read --halogen;-- |
| 20 | 32 | "ten carbon atoms" should read --ten carbon atoms,-- |
| 20 | 34 | "R," should read --R-- |

Signed and Sealed this

First Day of February, 1994

Attest:

Attesting Officer

BRUCE LEHMAN

Commissioner of Patents and Trademarks